Feb. 24, 1931. T. BARISH 1,793,896
ANTIFRICTION BEARING
Filed Oct. 27, 1928
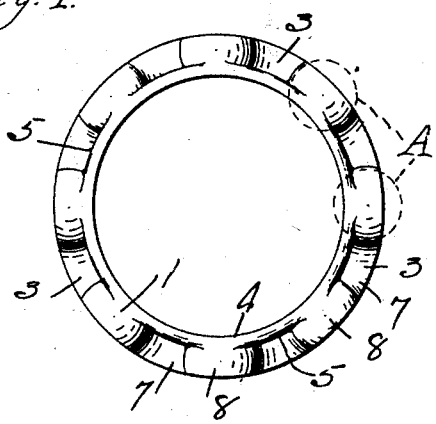
Fig. 1.
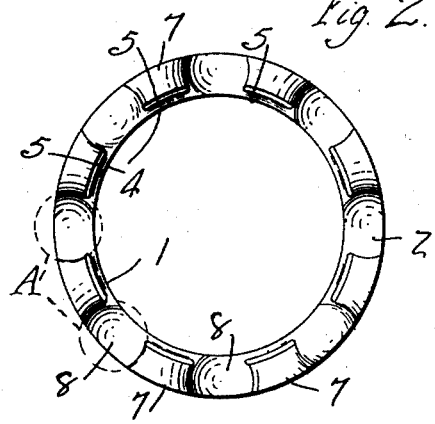
Fig. 2.
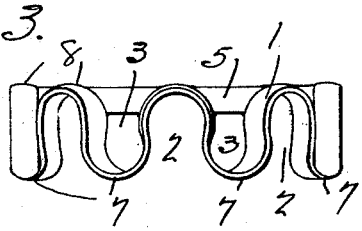
Fig. 3.
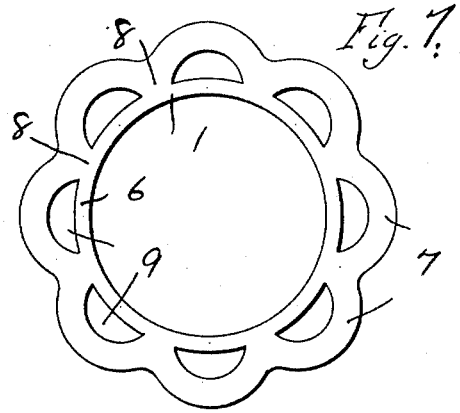
Fig. 7.
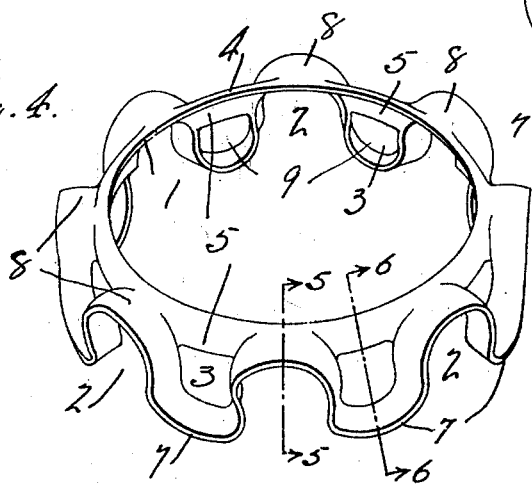
Fig. 4.
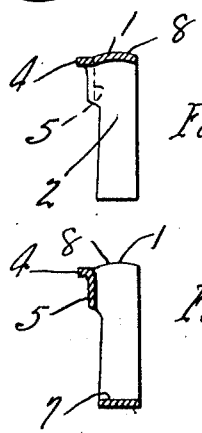
Fig. 5.
Fig. 6.
INVENTOR
Thomas Barish
by Parker & Prochnow
ATTORNEYS.

Patented Feb. 24, 1931

1,793,896

UNITED STATES PATENT OFFICE

THOMAS BARISH, OF JAMESTOWN, NEW YORK

ANTIFRICTION BEARING

Application filed October 27, 1928. Serial No. 315,499.

This invention relates to anti-friction bearings, and particularly to the retaining cages for the bearing elements.

An object of the invention is to generally improve cages for anti-friction bearing elements.

A further object of the invention is to provide an improved cage for bearing elements, which may be stamped and drawn from sheet metal, which will have desired rigidity, which will retain its shape under all operating conditions, and which will be relatively simple, light in weight, durable and inexpensive.

A further object of the invention is to provide an improved method of making retainer cages from sheet metal, and which will be relatively simple, practical and inexpensive.

Various other objects and advantages will be apparent from the following description of an embodiment of the invention, and the novel features will be particularly pointed out hereinafter in connection with the appended claims.

In the accompanying drawings:—

Fig. 1 is an end elevation of a cage constructed in accordance with this invention;

Fig. 2 is an opposite end elevation of the same;

Fig. 3 is a side elevation of the same;

Fig. 4 is a perspective of the same;

Fig. 5 is a transverse, sectional elevation of the same, the section being taken approximately along the line 5—5 of Fig. 4;

Fig. 6 is another transverse, sectional elevation of the same, the section being taken approximately along the line 6—6 of Fig. 4;

Fig. 7 is a plan of a stamped blank before it is drawn into the desired shape.

In the illustrated embodiment of the invention, the improved cage includes an endless strip 1 progressing in a circle to form a ring and while so progressing, undulating laterally from side to side to form one series of pockets 2 all opening at one end of the ring, and another series of pockets 3 opening at the opposite end of the ring and interposed between and alternating with the pockets 2.

The ring formed by the undulating strip 1, at one end is provided with an inturned ring or flange 4 which extends towards the axis of the ring, this flange serving to connect the undulations at one end of the ring, such as the bottoms of the undulations forming the one set of pockets 2.

The flange or ring 4 serves to connect the pockets 2 to one another and hold them in properly spaced relation to one another, and also to prevent collapse or distortion of the ring formed by the undulating strip 1. The bottoms or closed ends of the pockets 2 may also be connected to one another by strips 5 which are in the nature of flanges extending at an angle to the flange or ring 4, and these strips 5 resist distortion of the ring by forces applied in a direction endwise of the ring.

The flange 4, strips 5, and the undulating strip 1 are all formed of an integral piece of sheet metal and drawn from a die stamped blank in a manner which will be explained presently. The walls of the pockets 2, however, are formed to receive and retain the anti-friction bearing elements A (Figs. 1 and 2), such as balls, and hold them in spaced relation to one another, with opposite sides of the balls exposed for contact with the races of the bearing in the usual manner.

In forming the improved cage from sheet metal, a stamping having the shape or characteristics of that shown in Fig. 7 is first made from sheet metal, and this blank may have an inner ring portion 6, from the outer periphery of which extend scalloped loops 7 that connect spaced points 8 of the ring 6. The loops 7 include apertures 9 between themselves and the ring 6, and the scallop loops 7 and apertures 9 may be considered in the nature of an apertured scalloped edge of the blank or ring 6.

After the blank has been stamped from sheet metal, as indicated in Fig. 7, for example, the inner or unscalloped marginal portion of the ring 6 is securely clamped or held in any suitable manner, such as in suitable forms, and the outer or other margin portion of the ring 6 and the scallop loops 7 are drawn rearwardly, that is to one side of the plane of the held portion of the ring 6. The outer or other marginal portion of the ring 6 between the points 8 will form the flange strips 5, and the scallop loops 7 will form the undulating strip 1.

As the middle portions of the scallop loops 7 are forced rearwardly, they will also be forced inwardly towards the center of the ring 6, so that the side surfaces of the scallop loops 7 will remain radial to the axis of the ring 6. The portions of the ring 6 at the points 8 will not be flanged rearwardly, but will form a radial continuation of the held portion of the ring 6, as indicated clearly in Fig. 4.

After the scallop loops 7 have been formed into the undulating strip 1, the pockets 2, which are formed by the loops 7 leaving the ring 6 at each point 8, will be further formed, by suitable dies operating upon their side walls, to have the desired concavity and roundness to receive and retain the anti-friction bearing elements, such as the bearing balls.

After the bearing balls or elements A are received in the pockets 2, the portions of the loops 7 between the open ends of the pockets may be flattened or deformed slightly, so as to force the portions of the strip 1 at the open ends of the pockets 2, somewhat farther around the bearing balls and retain them within the pockets.

A cage formed in this manner will be relatively inexpensive because it is easily formed of a stamped and drawn sheet metal, the cage will have maximum rigidity against distortion from a circular ring by reason of the flange 4 and against distortion from a radial plane by the strips 5, and the entire cage will be relatively light, yet rigid and durable.

It will be obvious that various changes in the details which have been herein described and illustrated in order to explain the nature of the invention, may be made by those skilled in the art within the principle and scope of the invention as expressed in the appended claims.

Claims:—

1. A drawn sheet metal cage for anti-friction bearing elements comprising an integral piece of pliable sheet metal having an endless strip undulating laterally and progressing in a circle to form a ring with oppositely opening pockets, and also having means connecting the ends of alternate pockets to one another along one end of the ring, said alternate pockets being formed to receive and retain said elements.

2. A drawn sheet metal cage for anti-friction bearing elements comprising an integral piece of pliable sheet metal having an endless strip undulating laterally and progressing in a circle to form a ring with oppositely opening pockets, and also having a flange extending towards the center axis of the ring and connecting the ends of alternate pockets along one end of the ring, said alternate pockets being formed to receive and retain said elements.

3. A drawn sheet metal cage for anti-friction bearing elements comprising an integral piece of pliable sheet metal having an endless strip undulating laterally and progressing in a circle to form a ring with oppositely opening pockets, and also having a flange extending toward the center axis of the ring and connecting the ends of alternate pockets along one end of the ring, said flange also having strips extending angularly therefrom and connecting said alternate pockets at said one end of the ring.

4. The process of forming a retainer cage for anti-friction bearing elements which comprises stamping from sheet metal an annular ring having an apertured scalloped outer marginal edge, drawing the scalloped edge portion laterally from the same face of the ring to form element retaining pockets between adjacent scallops with the scallops themselves forming loops facing oppositely from said pockets.

5. The process of forming a retainer cage for anti-friction bearing elements which comprises stamping from sheet metal an annular ring with scallop loops projecting from the outer edge thereof, holding the inner marginal portion of the ring, and drawing the outer marginal portion of the ring and the loops laterally from one face of the held portion of the ring to form open element retaining pockets between the adjacent scallops, and with the outer marginal portion of the ring between the ends of each loop flanged angularly to the held portion of the ring on the same side of the held portion of the ring as the loops.

6. The process of forming a retainer cage for anti-friction bearing elements which comprises stamping from sheet metal an annular ring with scallop loops projecting from the outer margin of the ring in the same plane therewith, holding the inner marginal edge portion of the ring, drawing the metal of the loops laterally and inwardly of the ring until they are along their entire length at the same distance from the center of the ring and projecting from a face of the ring as open sided element receiving and retaining pockets connected by said ring.

7. The process of forming a retain cage for anti-friction bearing elements which comprises stamping from sheet metal an annular ring with scallop loops projecting from the outer margin of the ring in the same plane therewith, holding the inner marginal edge portion of the ring, drawing the metal of the loops laterally and inwardly of the ring until they are along their entire length at the same distance from the center of the ring and projecting from a face of the ring as open sided element receiving and retaining pockets connected by said ring, and flanging the outer marginal portion of the ring between the ends of each loop rearwardly at an angle to the held inner portion of the ring.

8. The process of forming a retainer cage for anti-friction bearing elements which comprises stamping from sheet metal an annular ring having scallop loops connecting spaced points of one periphery of the ring, drawing the loops away from one face of the ring to undulate laterally of the ring, and forming element retaining pockets of the portions of the undulations which define the spaces opening laterally in the same direction from the ring.

9. The process of forming a retainer cage for anti-friction bearing elements which comprises stamping from sheet metal an annular ring having scallop loops connecting spaced points of one periphery of the ring, drawing the loops and the adjacent marginal portions of the ring between the ends of each loop away from one face of the ring to form the loops into undulations laterally of the ring, and said adjacent marginal portions of the ring into flanges crosswise of a radius of the ring and connecting the undulations at the ends attached to the ring, and forming element retaining pockets of the portions of the undulations which define the spaces opening laterally in the same direction from the ring.

10. A drawn sheet metal cage for anti-friction bearing elements comprising a ring of sheet metal having a peripheral marginal strip drawn laterally from a face of the ring and undulating in directions endwise of the ring while progressing in a direction peripherally of the ring to form somewhat U-shaped pockets with the open ends of the U's facing alternately in opposite directions endwise of the ring, the walls of the pockets being approximately radial to the endwise axis of the ring.

11. A drawn sheet metal cage for anti-friction bearing elements comprising a ring of sheet metal having a peripheral marginal strip drawn laterally from a face of the ring and undulating in directions endwise of the ring while progressing in a direction peripherally of the ring to form somewhat U-shaped pockets with the open ends of the U's facing alternately in opposite directions endwise of the ring, the walls of the pockets being approximately radial to the endwise axis of the ring, the loops being largely at one side of the plane of the ring.

12. The method of forming a retainer cage for rolling anti-friction bearing elements which comprises drawing a peripheral marginal strip of an annular sheet metal ring laterally from a face of the ring into an undulatory shape, with the undulations extending in a direction endwise of the ring and progressing in a direction peripherally of the ring to form somewhat U-shaped pockets facing alternately in opposite directions endwise of the ring.

13. The method of forming a retainer cage for balls of anti-friction bearings which comprises drawing a marginal band of a flat sheet metal ring at spaced intervals in a direction endwise of the ring and to one side of the plane of the ring in a manner to form somewhat U-shaped pockets, with the open ends of the U's facing in directions endwise of the ring, and the walls of the pockets approximately radial to the endwise axis of the ring, and then varying the walls of certain of the pockets to receive and retain said balls.

THOMAS BARISH.